Aug. 30, 1966    J. W. EHLEN    3,269,431
CHAIN SAW SHARPENING MECHANISM
Filed April 3, 1963    3 Sheets-Sheet 2
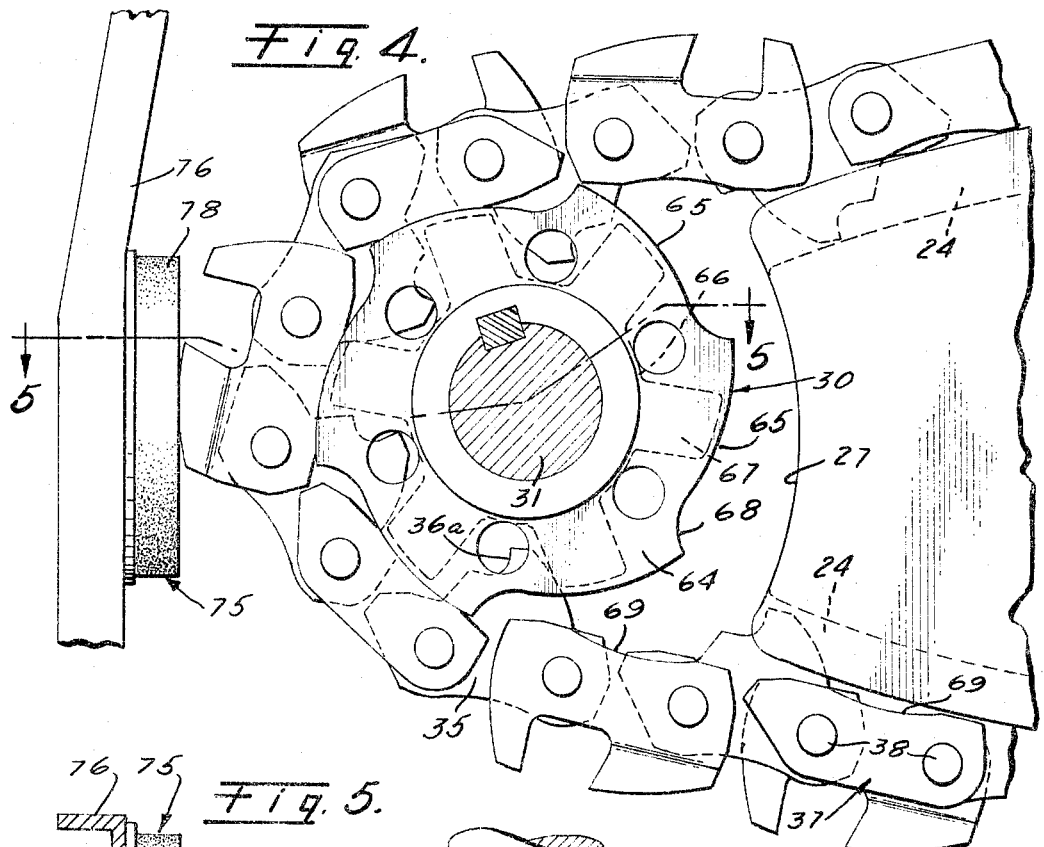
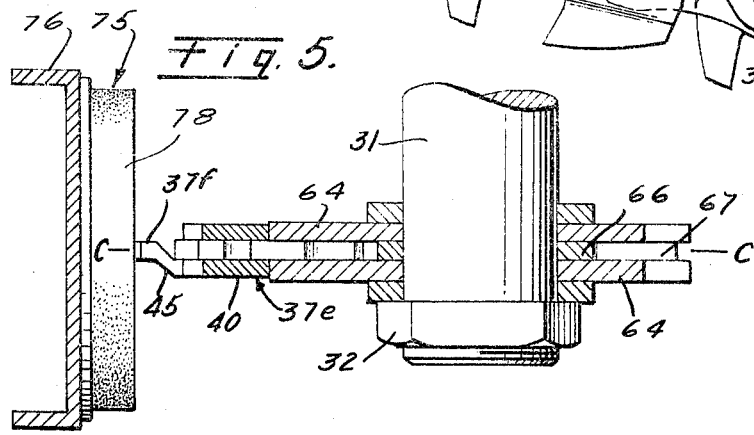
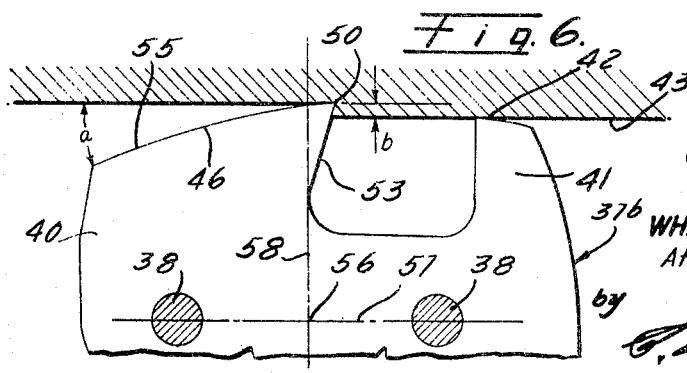
Jack W. Ehlen,
INVENTOR.
WHANN & McMANIGAL
Attorneys for Applicant

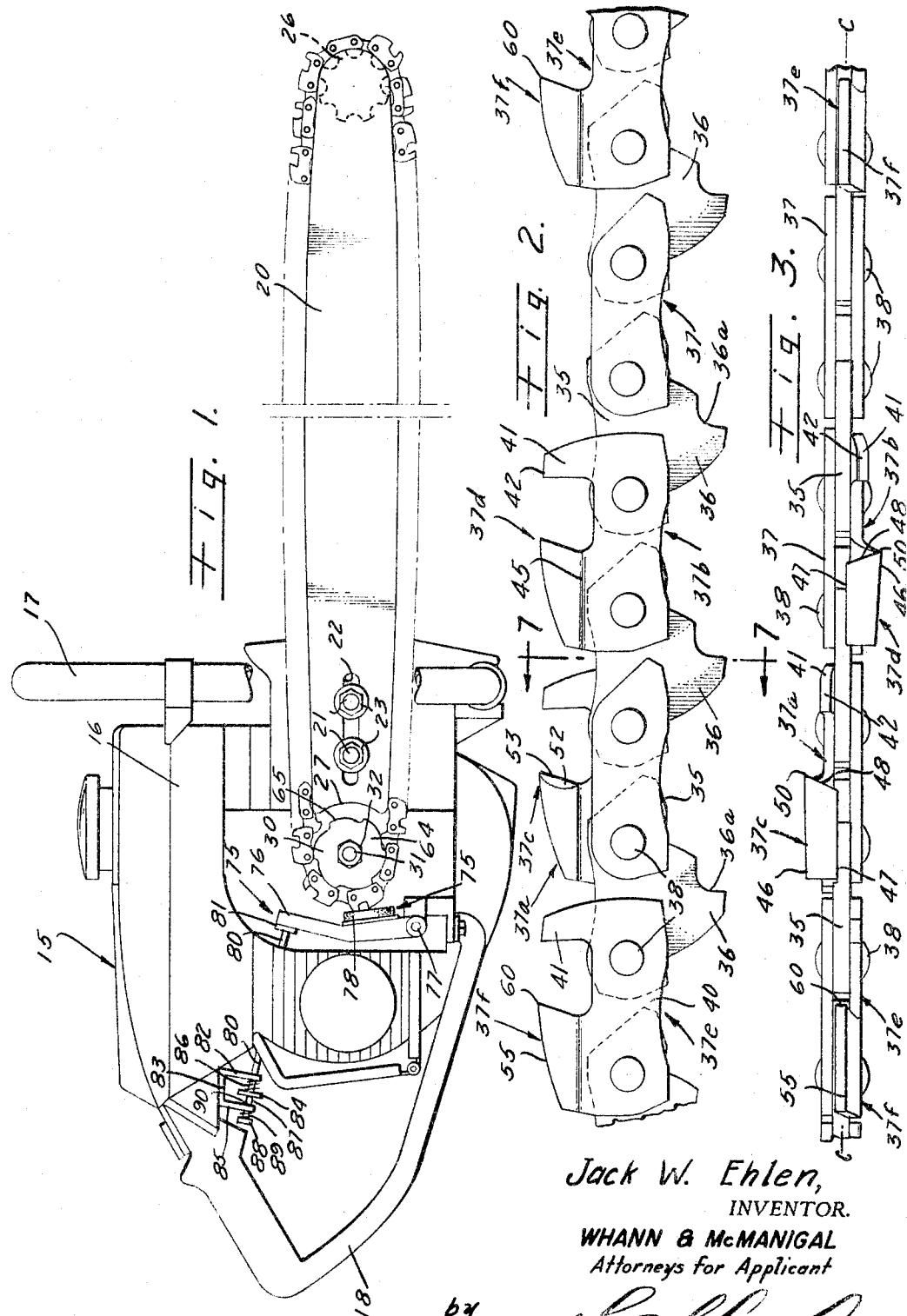

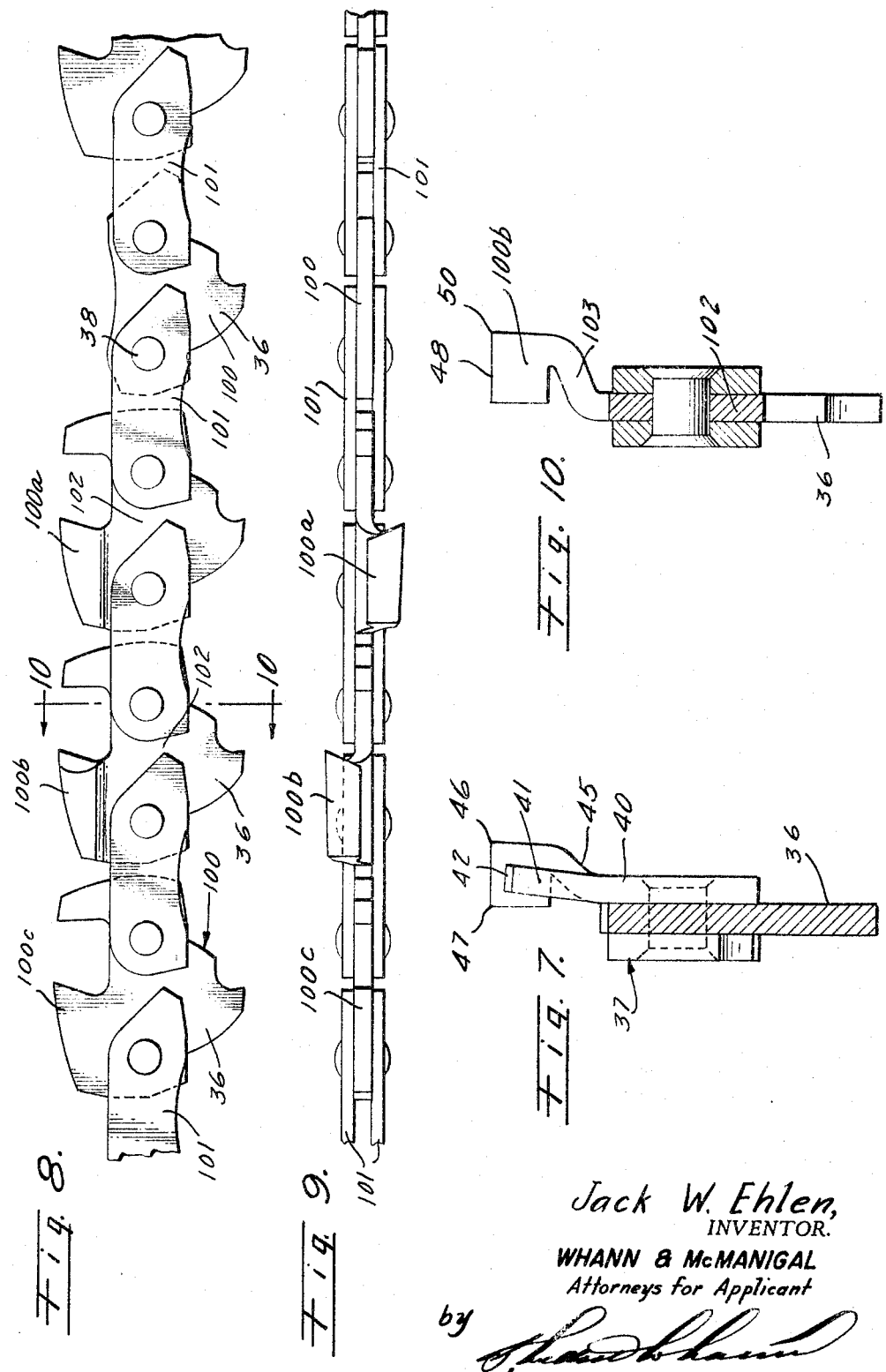

United States Patent Office 3,269,431
Patented August 30, 1966

3,269,431
CHAIN SAW SHARPENING MECHANISM
Jack W. Ehlen, Torrance, Calif., assignor to McCulloch Corporation, Los Angeles, Calif., a corporation of Wisconsin
Filed Apr. 3, 1963, Ser. No. 270,444
11 Claims. (Cl. 143—32)

This invention relates generally to saw chains and relates more particularly to saw chain sharpening mechanisms.

Chain saws are used to perform various types of cutting opeartions, such as, for example, felling, pruning, bucking and boring, and such saws are also used for cutting different kinds of trees and wood having different characteristics.

The teeth of the saw chains require different characteristics for different types of cutting and sawing and for different types of wood or trees. For example, the clearance angle of the cutters or teeth must be greater for boring operations than are required for felling, pruning and bucking.

There are, at the present time, a number of types of saw chains used in the lumber industry, including what is commonly known as the chisel type chain and also what is known as a curved router chain. Both types of cutters include side and bottom cutting edges which must be sharpened and resharpened to maintain the cutting teeth in economical operating condition.

The aggregate cutting edges of the cutters of such saw chains overlap to cut the kerf. Also, in such types of cutters, the upper surface curves inwardly from the leading to the following or trailing edge or end and is slanted to give clearance and the cutting edges comprise edges formed at the forward end of the top surface and along the inner side edge of said top surface.

Various problems and difficulties are encountered in providing a satisfactory clearance angle for the cutting elements of saw chains, particularly when the chain is operably mounted on the saw bar and its cutting elements or teeth are sharpened while the mechanism is being operated and it is an object of the present invention to provide sharpening means which will solve said problems and overcome said difficulties.

In solving the problems and overcoming the difficulties above referred to, the chain saw incorporating the present invention has a saw bar with a convexly curved nose at the outer end. There may be an idler sprocket at the outer end or nose of the bar for carrying the chain about the nose or there may be an idler wheel or the bar may merely have the arcuately shaped nose with a peripheral groove therein interconnecting the usual grooves at the top and bottom of the bar.

At the rear end of the bar there is a drive sprocket for driving the chain and the teeth or cutting elements of the saw chain are sharpened by grinding or removing metal from the top surface of the cutting elements or teeth while they are on the driving sprocket, the radius of the drive sprocket being the same as the radius of the nose of the bar.

With the present invention the driving sprocket comprises a central or hub portion with drive teeth for engagement with the driving lugs of links of the saw chain. The tooth part of the sprocket is sandwiched between side members having a series of cam surfaces on the peripehral edges thereof which receive the side links of the saw chain as said side links pass on to and around a portion of the sprocket and then pass on to the bar of the saw.

The links on the cam surfaces of the side plates of the sprocket are canted by said cams so that the trailing ends of the cutters are ground to a greater extent than the toe or leading ends of the teeth and as the teeth are carried on the sprocket and sharpened while thereon, said teeth are so ground as to have the proper clearance angle to meet the particular requirements of the type of cutting or sawing operation to be done.

As the angle of the cams on the peripheries of the side plates of the drive sprockets determines the size of the clearance angle, the cutting elements or teeth may be ground and sharpened to provide the required clearance angle to meet the requirements for different types of cutting operations by changing or substituting drive sprockets, installing one having cam surfaces with the angularity that will so position the top surfaces of the cutting elements or teeth of the saw chain on the drive sprocket relative to the grinding or sharpening element that the tops of said cutting elements or teeth will be accordingly ground and sharpened for optimum performance for any particular cutting operation.

Another object of the invention is to provide cutting elements on the chain having their forward cutting edges positioned forwardly of the midpoints of lines joining the centers of pivots of the respective cutter links.

It is still another object of the invention to provide a saw chain wherein the cutters are on certain types of links. For example, all of the cutter elements are on the side links or all are on the center links.

It is a further object of the invention to provide mechanism of this character wherein the sprocket teeth function only to drive the chain.

A still further object of the invention is to provide mechanism of this character wherein the sprocket has means for self-cleaning.

It is another object of the invention to provide mechanism of this character which functions smoothly during the grinding operation, so that the chain does not kick or rear itself as it goes around the sprocket, thereby eliminating roughness and/or chattering or bucking back at the operator.

It is still another object of the invention to provide mechanism of this character wherein the grinding element can be advanced against the tooth and there is a very smooth, uniform grinding operation.

With certain types of saw chains small limbs and twigs may get into the gap between trailing edges of the cutter elements and the depth gauge and get caught as the chain passes around the bar. This tends to grab at and kick the cutting package back at the operator and it is a further object of the present invention to provide a chain wherein this difficulty is minimized or overcome.

It is a still further object of the invention to provide mechanism of this character wherein wear of the sprocket and chain is reduced to a minimum.

It is a further object of the invention to provide mechanism of this character wherein engagement and disengagement of the teeth of the sprocket with the driving lugs on links of the chain is greatly improved.

It is a still further object of the invention to provide a chain having cutter sequences that greatly improve performance.

The characteristics and advantages of the invention are further sufficiently referred to in connection with the following detailed description of the accompanying drawings, which represent certain embodiments. After considering these examples skilled persons will understand that variations may be made without departing from the principles disclosed, and I contemplate the employment of any structures, arrangements or modes of operation that are properly within the scope of the appended claims.

Referring more particularly to the drawings, which are for illustrative purposes only:

FIG. 1 is a side view of a chain saw embodying the present invention;

FIG. 2 is an enlarged side view of a section of the saw chain;

FIG. 3 is a top plan view of the same;

FIG. 4 is an enlarged side view of the drive sprocket with the chain disposed thereon and the grinding or sharpening element in operative position;

FIG. 5 is a sectional view taken on line 5—5 of FIG. 4;

FIG. 6 is an enlarged side view of one of the side links carrying a cutter element or tooth;

FIG. 7 is an enlarged sectional view taken on line 7—7 of FIG. 2;

FIG. 8 is an enlarged side view of a section of chain with an alternative tooth arrangement;

FIG. 9 is a top plan view of the same; and

FIG. 10 is an enlarged sectional view taken on line 10—10 of FIG. 8.

Referring more particularly to FIG. 1, there is shown a chain saw, indicated generally at 15, having the usual housing and engine 16, there being front and rear handles 17 and 18 respectively. This part of the saw is well known and need not be described further. A saw bar 20 of well known character extends forwardly of the engine and is attached thereto by means of bolts 21, which extend through a slot 22 adjacent the rear end of said bar, there also being nuts 23 on said bolts for securing the bar thereon.

Bar 20 has the usual perpiheral grooves 24 in the top and bottom edges thereof, best shown in FIG. 4, and, as shown in FIG. 1, there is an idler sprocket 26 at the outer end or nose of the bar for carrying the chain about said nose. Alternatively, there may be in idler wheel at the nose of the bar for carrying the chain about said nose, or the bar may merely have the arcuately shaped nose with a peripheral groove therein interconnecting the grooves at the top and bottom of the bar 20. The rear end of the bar 20 is arcuately shaped, as at 27, said end being concave.

Rearwardly of the end 27 of the bar 20 is a drive sprocket 30 secured to a drive shaft 31 by means of a nut 32, said drive shaft 31 being operably mounted to and driven by the engine in the usual well known manner. Sprocket 30 has the same radius as the nose of the saw bar and is operably aligned with said bar, the periphery of said sprocket being spaced from the rear end 27 of bar 20, said rear end 27 having a radius based on the axis of the shaft 31 but of greater length than the radius of the sprocket.

Referring more particularly to the saw chain, said chain comprises center links 35 having sprocket drive lugs 36 projecting inwardly therefrom, and side links, indicated generally at 37, pivotally connected to the center links 35 by means of pintles 38 in the well known manner.

Certain selected side links 37a and 37b have allochirally arranged cutting elements or teeth 37c and 37d thereon and other side links, indicated at 37e, have center cutters 37f thereon.

Cutter links 37a and 37b with their respective cutters 37c and 37d are the same except that one is a left-hand link and the other is a right-hand link, so that a description of one will suffice.

These links may be variously formed and include a vertical body portion 40 which has rivet holes adjacent the ends for the rivets or pintles 38. Adjacent the forward end is a depth gauge 41 having a surface 42 for engagement with the bottom 43 of a kerf, as shown in FIG. 6, the depth of the cut being indicated at b.

The side links carrying the side teeth or cutter elements have a portion 45 with the cutter element or tooth carried at the top thereof.

The outer top edge 46 of the cutter extends outwardly or laterally of the plane of the body 40 while the inner top edge 47 extends generally parallel to the center line or plane C—C of the chain and, while it is spaced outwardly thereof, it is adjacent thereto.

The leading or front cutting edge 48 is inclined rearwardly and inwardly, there being a sharp cutting point 50 at the outer end of said cutting edge 48.

From the leading cutting edge 48 the cutter element or tooth is inclined reawardly and downwardly and the inner forward end is beveled rearwardly as at 52 to provide a sharp side cutting edge 53 which may be sharpened by filing, honing, or any other suitable well known means.

The top surfaces 55 of the teeth or cutter elements curve rearwardly and inwardly to provide the proper clearance angle a, FIG. 6, for optimum cutting performance. This clearance angle may vary from that shown and produce very satisfactory results.

The forward cutting edges 48 are positioned forwardly of the mid points 56, FIG. 6, of line 57 joining the centers of the pivots or pintles 38, the line 58 being perpendicular to the line 57 and extending upwardly from the mid point 56 on said line 57.

The side links 37e also have vertical body portions 40 and each of said side links 37e have an upwardly and inwardly inclined portion 45 which carries the cutter element or tooth 37f at the outer edge there. The cutter tooth 37f is centrally located relative to the center line or plane C—C, FIG. 5, of the chain for removal of the longitudinal central portion of the kerf left between the effective cutting regions or areas of the side cutting elements or teeth. It is to be understood, of course, that the front or forward cutting edge 60 of each center cutting element 37f is also positioned ahead of the mid point of the lines joining the centers of the pivots for the links 37e carrying said cutting elements or teeth 37f. Also, the top surface 55 of the center cutting elements 37f have the same curvature as the side cutting elements 37c and 37d.

In order to properly grind the top surface 55 of the cutter elements or teeth so as to provide a proper operative clearance angle a at the heel, the drive sprocket 30 is provided with side members or plates 64 having a series of peripheral cam surfaces 65 thereon, the toothed part of the sprocket being sandwiched between the side members 64 of the sprocket and said side members spaced apart in a central part 66 having drive teeth 67, which will be more particularly described hereinafter.

The cam surfaces 65 of the side members 64 of the drive sprocket are lowest at their leading or forward ends and curve outwardly and rearwardly. In other words, the forward or leading ends of the cam surfaces 65 are closer to the axis of the sprocket than the trailing ends thereof, and the side members having forwardly and radially outwardly extending concave portions 68 which connect the forward ends of respective cam surfaces 65 with the trailing ends of the next preceding cam surfaces.

As the sprocket is rotated to drive the chain the side links move onto said cam surfaces 65, it being noted that the inner edges 69 of the side links have the same curvature as the curvature of the cam surfaces and hence accurately seat on said surfaces and conform to the profile thereof.

The sprocket teeth 67 are radially arranged and annularly spaced apart and the sprocket drive lugs 36 of the center links of the chain are shaped for operable reception in the spaces between said sprocket teeth. It is to be noted that the forward free ends of the lugs 36 are provided with concavely shaped recesses 36a and the trailing edges of said lugs are convexly curved. The arrangement is such that the lugs will readily move into the spaces between the sprocket driving teeth and will properly move out of said spaces as the chain moves away from the sprocket, the trailing ends of the sprocket driving teeth being accommodated by the notches 36a as the lugs 36 leave their respective spaces between said sprocket driving lugs.

The means for grinding the tops of the cutter elements or teeth is indicated generally at 75 and comprises a generally vertical lever 76 pivoted at the bottom on a pivot pin 77 secured to the engine. Intermediate the ends of the lever 76 is a sharpening or abrasive element 78 secured to said lever by any suitable means.

The abrasive element 78 may be of any suitable type. Examples of the abrasive elements that can be used are shown in the copending Oehrli application Serial No. 60,451, filed October 4, 1960, for Sharpening Means for Chain Saws. Another copending application showing sharpening means for saw chains is John R. Muir, application Serial No. 184,007, filed April 2, 1962, for Chain Saw With Sharpening Means. The abrasive element 78 is shown as being of the stationary type although it may be of the rotatable type.

The abrasive element 78 is so located that when the upper end of the lever 76 is moved forwardly the forward surface of said abrasive element is moved toward the sprocket and into engagement with the top surfaces of the cutter elements or teeth on that portion of the chain disposed on and passing about the rear of the sprocket 30. Consequently the arcuate path of the cutting elements or teeth of the saw chain has its radius based on the axis of said sprocket.

Means for moving the lever 76 to bring the sharpening element into operable engagement with the cutter teeth and also into grinding engagement with the depth gauges, may be effected by any suitable means, the means shown herein comprising a rod 80 having an enlarged forward end 81 engageable with the upper end of a lever 76, the rear end of said rod being slidably disposed in an opening provided therefor in an arm 82, a bracket 83 secured to the engine by any suitable means, such as screws, for example, not shown. The rear end of rod 80 is provided with an enlarged head 84 which is disposed intermediate the arm 82 of said bracket 83 and a rearwardly spaced arm 85 of said bracket. A spring 86 is disposed between the arm 82 and head 84 for urging the rod rearwardly and any suitable means such as a spring, not shown, is operably connected with the lever 76 to urge same counterclockwise and against the enlarged end 81 of rod 80.

A rod 87 is slidably mounted in an opening provided therefor in the arm 85 of bracket 83 and in axial alignment with the rod 80. The rear end of rod 87 is provided with a head 88 for engagement by a thumb of the operator for pushing said rod 87 forwardly and hence pushing rod 80 forwardly to move the lever 76 clockwise so that the abrasive element will operably engage the outer free ends of the depth gauges and the top surfaces of the cutter elements or teeth. A spring 89 reacts between the arm 85 and head 88 to urge the rod 87 rearwardly, the rearward movement of said rod being limited by a pin 90.

It is to be understood, of course, that other means may be utilized to operably actuate the lever 76 or other suitable support for the grinding of sharpening element 78 between an inoperative position and an operative grinding position.

Because the trailing ends of the cam surfaces 65 are further from the axis of the sprocket than the leading ends the side links mounted on said cam surfaces are canted so that the trailing ends or heels of the cutters are further from the axis of the sprocket and are therefore ground to a greater extent than the toe or leading end of the teeth. Thus, when the cutter carrying links are on the saw bar or are passing around the nose thereof said teeth will have adequate clearance. In other words, there will be the proper clearance angle for optimum cutting.

Since the depth gauges are on the same links carrying respective teeth or cutting elements, the top surface of said depth gauges will be ground to the proper extent to provide the desired or required depth of the cut of the respective teeth.

The teeth are arranged in series of sequences, the arrangement shown in FIGS. 2 and 3 having a right hand tooth followed immediately by a left hand tooth and that followed immediately by a center cutting tooth. A space is provided between the latter tooth and the right hand cutter or tooth of the following sequence, the space being clearly shown in FIG. 2, wherein there is a center link 35 pivotally connected to the last side links of the sequence, a center link pivotally connected to the leading side link of the next sequence, said center links being connected by side links which do not have cutters or teeth thereon.

In FIGS. 8 and 9 there is shown a chain wherein all of the cutting elements of the teeth are on center links. These teeth are of similar construction as the corresponding teeth of the arrangement shown in FIGS. 2 and 3.

The center links are indicated at 100 and the side links are indicated at 101. The center links are provided with sprocket drive lugs which are indicated at 36 and they are the same character as the drive lugs 36 of the chain shown in FIGS. 2 and 3. Certain selected center links have allochirally arranged side cutting elements or teeth 100a and 100b. These cutter carrying links and their cutters are the same except that one carries a right hand cutter and the other carries a left hand cutter. The center link comprises a vertical body portion 102 having the usual rivet holes adjacent the ends for the rivets or pintles 38 whereby the links are articulately connected to adjacent links. From the upper side of the body portion 102 there is a laterally offset portion 103 which extends outwardly and upwardly. The cutting element or tooth of each of the center links carrying side cutting elements is disposed at the upper end of the offset portion 103. Other center links have a center cutter element or tooth 100c for removing the central heart of the kerf not removed by the side cutter elements or teeth, the latter being arranged so that there is not an overlapping of their cutting paths.

All of the teeth of the arrangement shown in FIGS. 8 and 9 have their forward cutting edges positioned forwardly of the mid points of lines joining the centers of the pivots or pintles, as in the arrangements shown in FIGS. 2 and 3.

The chain shown in FIGS. 8 and 9 have the teeth or cutting elements arranged in the same sequence as the chain shown in FIGS. 2 and 3 with a space between each sequence. It is to be understood, of course, that other sequences may be used.

In order to properly grind the top surfaces of the cutter elements and depth gauges of chains wherein the cutter elements are all disposed on the center links, the sprocket 30 is reversed so that the higher ends of the cam surfaces 65 lead and the lower ends thereof trail. The side links seat on the cam surfaces 65 as the sprocket rotates to drive the chain and leave said surfaces as the chain moves on to the rear end of the bar of the saw. By thus reversing the side plates of the sprocket to reverse the cam surfaces thereof the center links carrying the cutter elements or teeth are properly canted so that the heels of the cutters are ground to a greater extent than the toes thereof and a proper clearance for the heels of said cutters is provided.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific forms shown or uses mentioned except as defined in the accompanying claims, wherein various portions have been separated for clarity of reading and not for emphasis.

I claim:
1. A chain saw, including:
   (A) an engine;
   (B) a saw bar having its rear end secured to said engine, said saw bar extending forwardly of the engine and having a peripheral groove therein;

(C) a sprocket operably mounted on said engine and driven thereby, said sprocket being operably aligned with said bar and located adjacent the rear end thereof, said sprocket having side plates with annularly spaced peripherally arranged cam surfaces thereon, the trailing ends of said cam surfaces being further from the axis of the sprocket than the leading ends thereof;

(D) sprocket driving teeth disposed between said side plates of the sprocket, said driving teeth being annularly spaced apart;

(E) an articulate saw chain operably mounted on said bar and said sprocket, said chain having center links and side links pivotally connected to said center links, said center links having sprocket drive lugs operably receivable in the spaces between the sprocket driving teeth, certain respective selected side links having right and left hand side cutting elements and other of said side links having center cutting elements thereon, said cutting elements having cutting edges at the leading sides and tops, said cutting elements having upper surfaces which curve inwardly from the leading to the following ends, said top cutting edges being positioned forwardly of the midpoints of lines joining the centers of pivots for the respective cutter links, depth gauges on said cutter links, said depth gauges being spaced forwardly of the cutting elements of cutter carrying links, said side links seating on the cam surfaces of the sprocket when disposed on said sprocket, said cutting elements being moved by said sprocket in an arcuate path when disposed on said sprocket;

(F) sharpening means for removing material from the top surface of the cutting elements and depth gauges, said sharpening means including an abrasive sharpening element positioned adjacent the sprocket;

(G) and supporting means for said abrasive sharpening element, said supporting means being movable from a position whereat said sharpening element is spaced from the arcuate path of movement of the outer surfaces of said cutting elements and said depth gauges toward said path of movement and into engagement with said cutting elements and depth gauges as the links carrying same are moved through said arcuate path of movement by said sprocket and while said links are disposed on said sprocket.

2. A chain saw, including:
(A) an engine;
(B) a saw bar having its rear end secured to said engine, said saw bar extending forwardly of the engine and having a peripheral groove therein;
(C) a sprocket operably mounted on said engine and driven thereby, said sprocket being operably aligned with said bar and located adjacent the rear end thereof, said sprocket having side plates with annularly spaced peripherally arranged cam surfaces thereon, the trailing ends of said cam surfaces being further from the axis of the sprocket than the leading ends thereof;
(D) sprocket driving teeth disposed between said side plates of the sprocket, said driving teeth being annularly spaced apart;
(E) an articulate saw chain operably mounted on said bar and said sprocket, said chain having center links and side links pivotally connected to said center links, said center links having sprocket drive lugs operably receivable in the spaces between the sprocket driving teeth, certain respective selected side links having right and left hand side cutting elements and the other of said side links having center cutting elements thereon, said cutting elements including cutting edges at the leading top edges, said cutting elements having upper surfaces which curve inwardly from the leading to the following ends with the sharp cutting edges at the forward ends thereof, said cutting edges being positioned forwardly of the midpoints of lines joining the centers of pivots for the respective cutter links, said side links seating on the cam surfaces of the sprocket when disposed on said sprocket and said cutting elements moving through an arcuate path when disposed on said sprocket;
(F) sharpening means for removing material from the top surface of the cutting elements, said sharpening means including an abrasive sharpening element positioned adjacent the sprocket;
(G) supporting means for said abrasive sharpening element, said supporting means being movable from a position whereat said sharpening element is spaced from the arcuate path of movement of the outer surfaces of said cutting elements toward the arcuate path of movement thereof and into engagement with said cutting elements as the links carrying same are moved through said arcuate path of movement by said sprocket and while said links are disposed on said sprocket.

3. A chain saw, including:
(A) an engine;
(B) a saw bar having its rear end secured to said engine, said saw bar extending forwardly of the engine and having a peripheral groove therein;
(C) an engine driven sprocket operably mounted on said engine adjacent the rear end of said bar, said sprocket including side plates with annularly spaced peripherally arranged cam surfaces thereon, the trailing ends of said cam surfaces being further from the axis of the sprocket than the leading ends thereof;
(D) sprocket driving teeth disposed between said side plates of the sprocket;
(E) an articulate saw chain operably mounted on said bar and said sprocket, said chain having center links and side links pivotally connected to said center links, said center links having sprocket drive lugs, certain respective selected side links having right and left hand side cutting elements and other of said side links having center cutting elements thereon, said cutting elements having outer surfaces which curve inwardly from the leading to the following ends with sharp cutting edges at the forward ends thereof, said cutting edges being positioned forwardly of the midpoints of lines joining the centers of pivots for the respective cutter links, said side links seating on the cam surfaces of the sprocket when disposed on said sprocket;
(F) sharpening means for removing material from the top surface of the cutting elements, said sharpening means including an abrasive sharpening element positioned adjacent the sprocket;
(G) and supporting means for said sharpening element, said supporting means being movable from a position whereat said sharpening element is spaced from the arcuate path of movement of the outer surfaces of said cutting elements when on said sprocket toward said path of movement and into engagement with said top surfaces of said cutting elements as the links carrying same are advanced by said sprocket.

4. A chain saw, including:
(A) an engine;
(B) a saw bar operably secured to said engine and having a peripheral groove therein;
(C) an engine driven sprocket operably mounted on said engine and operably aligned with said bar, said sprocket having annularly spaced peripherally arranged similar cam surfaces thereon, one end of each cam surface being closer to the axis of the sprocket than the other end thereof, said sprocket having driving teeth;

(D) an articulate saw chain operably mounted on said bar and said sprocket, said chain having a series of center links and a series of side links pivotally connected to said center links, one series of links having sprocket drive lugs operably engageable by the sprocket driving teeth, the links of one series of links having respective right and left hand side cutting elements and center cutting elements thereon, said cutting elements having upper surfaces with sharp cutting edges at the forward ends thereof, said cutting edges being positioned forwardly of the midpoints of lines joining the centers of pivots for the respective cutter links, at least one series of links seating on the cam surfaces of the sprocket when said links are disposed on said sprocket;

(E) sharpening means for removing material from the top surface of the cutting elements for sharpening the cutting edges of said cutting element, said sharpening means including sharpening member;

(F) and supporting means for said sharpening element, said supporting means being movable from a position whereat said sharpening element is spaced from the arcuate path of movement of the outer surfaces of said cutting elements when disposed on said sprocket into engagement with the top surfaces of said cutting elements as they are moved through said arcuate path of movement by said sprocket.

5. The invention defined by claim 4, wherein the cutting elements are arranged in repetitive sequences of a pair of allochirally arranged cutting elements followed by a center cutting element, said cutting elements of a sequence having substantially uniform spacing from each other, but the leading cutting element of a sequence being spaced from the adjacent trailing cutting element of the preceding sequence a greater distance than the spacing of the cutting elements in a sequence.

6. In a chain saw:
(A) an engine;
(B) a saw bar operably secured to said engine and having a peripheral groove therein;
(C) an engine driven sprocket operably mounted on said engine and operably aligned with said bar;
(D) an articulate saw chain having center links and side links pivotally connected to said center links, each link having a rear pivot and a forward pivot; certain of said links having respective side cutting elements and center cutting elements thereon, said cutting elements having sharp cutting edges at the forward top ends thereof, said saw chain being operably mounted on said bar and on said sprocket, means for canting the cutting element carrying links, when on said sprocket with the trailing ends of said cutting element carrying links further from the axis of said sprocket than the leading ends;
(E) sharpening means for removing material from the top surfaces of the cutting elements for sharpening the cutting edges of said cutting elements, said sharpening means including a sharpening member;
(F) and supporting means for said sharpening member, said supporting means being movable between a position whereat said sharpening member is spaced from the arcuate path of movement of the outer surfaces of the cutting elements when disposed on said sprocket and into engagement with the top surfaces of said cutting elements as they are moved through said arcuate path of movement by said sprocket, the canting of said cutting elements carrying links being such that the sharpening member removes material from the heel of the cutting elements to provide a clearance angle for the tops of said teeth when said teeth are in their normal cutting position.

7. In a chain saw:
(A) an engine;
(B) a saw bar operably secured to said engine and having a peripheral groove therein;
(C) an engine driven sprocket operably mounted on said engine and operably aligned with said bar;
(D) an articulate saw chain having center links and side links pivotally connected to said center links with the leading ends of the side links pivotally connected to the trailing ends of the center links, and the trailing ends of said side links pivotally connected to the leading ends of the center links, certain of said links having respective side cutting elements and center cutting elements thereon, said cutting elements having sharp cutting edges at the forward top ends thereof, said saw chain being operably mounted on said bar and on said sprocket, means for canting the cutting element carrying links, when on said sprocket with the trailing ends of said cutting element carrying links further from the axis of said sprocket than the leading ends;
(E) and sharpening means for removing material from the top surfaces of the cutting elements.

8. In a chain saw:
(A) an engine;
(B) a saw bar with a convexly arcuate nose and a peripheral groove, said saw bar being operably secured to said engine;
(C) an engine driven sprocket operably mounted on said engine and operably aligned with said bar, the radius of said nose being the same as the radius of said sprocket;
(D) an articulate saw chain having center links and side links pivotally connected to said center links with each link having a rear pivot and a forward pivot, certain of said links having respective side cutting elements and center cutting elements thereon, said cutting elements having sharp cutting edges at the forward top ends thereof, said saw chain being operably mounted on said bar and on said sprocket, means for canting the cutting element carrying links, when on said sprocket with the trailing ends of said cutting element carrying links further from the axis of said sprocket than the leading ends;
(E) and sharpening means for removing material from the top surfaces of the cutting elements when said cutting elements are on said sprocket.

9. In a chain saw:
(A) an engine;
(B) a saw bar with a convexly arcuate nose and a peripheral groove, said saw bar being operably secured to said engine;
(C) an engine driven sprocket operably mounted on said engine and operably aligned with said bar, the radius of said nose being the same as the radius of said sprocket;
(D) an articulate saw chain having center links and side links pivotally connected to said center links with the leadings ends of the side links pivotally connected to the trailing ends of the center links, and the trailing ends of said side links pivotally connected to the leading ends of the center links; certain of said links having respective side cutting elements and center cutting elements thereon, said cutting elements having sharp cutting edges at the forward top ends thereof, said saw chain being operably mounted on said bar and on said sprocket, means for canting the cutting element carrying links, when on said sprocket with the trailing ends of said cutting element carrying links further from the axis of said sprocket than the leading ends;
(E) and sharpening means for removing material from the top surfaces of the cutting elements when said cutting elements are on said sprocket.

10. In a chain saw:
(A) an engine;
(B) a saw bar operably secured to said engine and having a peripheral groove therein;

(C) an engine driven sprocket operably mounted on said engine and operably aligned with said bar;
(D) an articulate saw chain having center links and side links pivotally connected to said center links, each link having a rear pivot and a forward pivot; certain of said links having respective side cutting elements and center cutting elements thereon, said cutting elements having sharp cutting edges at the forward top ends thereof, said saw chain being operably mounted on said bar and on said sprocket, means for canting the cutting element carrying links, when on said sprocket with the trailing ends of said cutting element carrying links further from the axis of said sprocket than the leading ends;
(E) and sharpening means adjacent said sprocket and movable into engagement with the top surfaces of the cutting elements when said cutting elements are on said sprocket for sharpening said cutting elements.

11. In a chain saw having an engine:
(A) a saw bar adapted to be operably secured to said engine and having a peripheral groove therein, said bar having a convexly arcuate nose;
(B) an engine driven sprocket operably mounted on said engine and operably aligned with said bar, the radius of said sprocket being the same as the radius of the bar nose;
(C) an articulate saw chain having center links and side links pivotally connected to said center links, each link having a rear pivot and a forward pivot, certain of said links having respective side cutting elements and center cutting elements thereon, said cutting elements having sharp cutting edges at the forward top ends thereof, said saw chain being operably mounted on said bar and on said sprocket and the cutting elements of said chain being adapted to be sharpened by grinding the top surfaces thereof when the links carrying said cutting elements are on said sprocket and are being moved thereby, and means for canting the links carrying said cutting elements when said links are on said sprocket with the trailing ends of said links carrying said cutting elements further from the axis of said sprocket than the leading ends.

References Cited by the Examiner
UNITED STATES PATENTS

| | | | |
|---|---|---|---|
| 1,201,748 | 10/1916 | Luce | 74—243 |
| 2,651,336 | 9/1953 | Warren | 143—135 |
| 2,832,380 | 4/1958 | Crowe | 143—135 |
| 2,857,942 | 10/1958 | Mull | 143—135 |
| 2,884,798 | 5/1959 | Wilson | 74—243 |
| 2,976,900 | 3/1961 | Mills | 143—135 |
| 3,040,602 | 6/1962 | Carlton | 143—32 |
| 3,059,491 | 10/1962 | Hoff et al. | 74—243 |
| 3,144,059 | 8/1964 | Oehrli | 143—135 |

DONALD R. SCHRAN, *Primary Examiner.*